US012786768B2

(12) United States Patent
Han et al.

(10) Patent No.: US 12,786,768 B2
(45) Date of Patent: Nov. 3, 2026

(54) METHODS AND APPARATUS FOR AGGREGATE MEASUREMENT REPORT

(71) Applicant: Lenovo (Beijing) Limited, Beijing (CN)

(72) Inventors: Jing Han, Beijing (CN); Haiming Wang, Beijing (CN); Min Xu, Beijing (CN); Jie Hu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 643 days.

(21) Appl. No.: 18/044,525

(22) PCT Filed: Sep. 25, 2020

(86) PCT No.: PCT/CN2020/117598
§ 371 (c)(1),
(2) Date: Mar. 8, 2023

(87) PCT Pub. No.: WO2022/061686
PCT Pub. Date: Mar. 31, 2022

(65) Prior Publication Data
US 2023/0337032 A1 Oct. 19, 2023

(51) Int. Cl.
*H04W 24/10* (2009.01)

(52) U.S. Cl.
CPC .................................. *H04W 24/10* (2013.01)

(58) Field of Classification Search
CPC ............................... H04W 24/10; Y02D 30/70
See application file for complete search history.

(56) References Cited

U.S. PATENT DOCUMENTS

| | | | | |
|---|---|---|---|---|
| 2014/0171062 | A1 | 6/2014 | Fallgren et al. | |
| 2014/0313920 | A1* | 10/2014 | Chai | H04W 36/0088 370/252 |
| 2015/0282142 | A1 | 10/2015 | Dahlman et al. | |
| 2015/0319667 | A1* | 11/2015 | Dalsgaard | H04W 36/302 455/444 |
| 2018/0213379 | A1* | 7/2018 | Xiong | H04W 4/70 |

(Continued)

FOREIGN PATENT DOCUMENTS

| | | | |
|---|---|---|---|
| CN | 110603841 | A | 12/2019 |
| CN | 111201721 | A | 5/2020 |
| WO | 2011123755 | A1 | 10/2011 |

OTHER PUBLICATIONS

PCT/CN2020/117598 , "International Preliminary Report on Patentability", PCT Application No. PCT/CN2020/117598, Apr. 6, 2023, 5 pages.

(Continued)

*Primary Examiner* — Austin J Moreau
(74) *Attorney, Agent, or Firm* — FIG. 1 Patents

(57) ABSTRACT

Embodiments of the present disclosure relate to methods and apparatus for aggregate measurement report. According to an embodiment of the present disclosure, a method performed by a first user equipment (UE) may include: receiving at least one measurement report from at least one second UE; determining, based on a configured condition, whether to transmit an aggregate measurement report which is based on the at least one measurement report; and transmitting the aggregate measurement report in response to determining to transmit the aggregate measurement report.

20 Claims, 4 Drawing Sheets

(56) References Cited

U.S. PATENT DOCUMENTS

| | | | | |
|---|---|---|---|---|
| 2019/0166640 | A1* | 5/2019 | Wei | H04W 72/52 |
| 2021/0352689 | A1* | 11/2021 | Jung | H04L 1/08 |
| 2022/0295442 | A1* | 9/2022 | Goyal | H04W 64/00 |
| 2023/0007521 | A1* | 1/2023 | Takahashi | H04W 16/28 |

OTHER PUBLICATIONS

PCT/CN2020/117598 , "International Search Report and Written Opinion", PCT Application No. PCT/CN2020/117598, Jun. 23, 2021, 6 pages.

* cited by examiner

METHODS AND APPARATUS FOR AGGREGATE MEASUREMENT REPORT

TECHNICAL FIELD

Embodiments of the present disclosure are related to wireless communication technologies, and more particularly, related to methods and apparatuses for aggregate measurement report for an unmanned aerial vehicle (UAV) swarm.

BACKGROUND

Techniques of measurement report have been recently studied to support UAV use cases. For example, the interference from a UAV to a terrestrial user equipment (UE) can be considered and eased by downlink interference detection by a multi-cell measurement report, as well as uplink power control to decrease uplink interference. The mobility aspect of the UAV is addressed too, e.g., to support a height-based measurement report and location report. Flight path information of a UAV can also be reported to a network for a potential special treatment for UAV mobility.

One important scenario for UAVs in a new radio (NR) communication system is a UAV swarm including a UAV master and one or more UAV members. For a UAV swarm, trigger and transmission of measurement reports of the UAV master and UAV member(s) need be enhanced to consider UAV swarm characteristics.

SUMMARY OF THE DISCLOSURE

Embodiments of the present disclosure provide improved measurement reporting for a UE, e.g., a UAV master in a UAV swarm, which can transmit an aggregate measurement report to a base station (BS).

According to some embodiments of the present disclosure, a method performed by a first UE may include: receiving at least one measurement report from at least one second UE; determining, based on a configured condition, whether to transmit an aggregate measurement report which is based on the at least one measurement report; and transmitting the aggregate measurement report in response to determining to transmit the aggregate measurement report.

In an embodiment of the present disclosure, determining whether to transmit the aggregate measurement report may include determining to transmit the aggregate measurement report when a total number of the at least one second UE exceeds a configured threshold. In another embodiment of the present disclosure, determining whether to transmit the aggregate measurement report may include determining to transmit the aggregate measurement report when a total number of cells reported by the at least one measurement report exceeds a configured threshold. In still another embodiment of the present disclosure, determining whether to transmit the aggregate measurement report may include determining to transmit the aggregate measurement report when a total number of different cells reported by the at least one measurement report exceeds a configured threshold. The configured threshold in any embodiment of the present disclosure may be based on a report type of the at least one measurement report. Additionally or alternatively, the configured threshold may be based on an event type of the at least one measurement report when the at least one measurement report is event triggered.

In another embodiment of the present disclosure, determining whether to transmit the aggregate measurement report may include determining to transmit both the aggregate measurement report and a measurement report of the first UE when a report trigger event for the first UE is fulfilled. In yet another embodiment of the present disclosure, determining whether to transmit the aggregate measurement report may include determining, based on an additional condition, whether to transmit the aggregate measurement report or a measurement report of the first UE when a report trigger event for the first UE is fulfilled. Determining whether to transmit the aggregate measurement report or the measurement report of the first UE may include determining to transmit the aggregate measurement report when a total number of different cells reported by the at least one measurement report is larger than a total number of different cells reported by the measurement report of the first UE.

In an embodiment of the present disclosure, the aggregate measurement report may be based on a report type of the at least one measurement report from at least one second UE. In another embodiment of the present disclosure, the aggregate measurement report may be based on an event type of the at least one measurement report when the at least one measurement report is event triggered.

In an embodiment of the present disclosure, the method performed by the first UE may further include: starting a timer when receiving a first one of the at least one measurement report; and transmitting the aggregate measurement report when the timer expires. The method may further include stopping the timer when transmitting the aggregate measurement report.

In an embodiment of the present disclosure, the aggregate measurement report may include a list of measurement results from the at least one measurement report. In another embodiment of the present disclosure, the aggregate measurement report may include a processed measurement result based on the at least one measurement report. The processed measurement result may include an average value of measurement results from the at least one measurement report.

According to other embodiments of the present disclosure, an apparatus may include: at least one non-transitory computer-readable medium having stored thereon computer executable instructions; at least one receiving circuitry; at least one transmitting circuitry; and at least one processor coupled to the at least one non-transitory computer-readable medium, the at least one receiving circuitry and the at least one transmitting circuitry. The computer executable instructions may cause the at least processor to implement a method according to any embodiment of the present disclosure.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended drawings. These drawings depict only exemplary embodiments of the present disclosure and are not therefore intended to limit the scope of the present disclosure.

DETAILED DESCRIPTION

The detailed description of the appended drawings is intended as a description of the currently preferred embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

In the following description, numerous specific details are provided, such as examples of programming, software modules, network transactions, database structures, hardware modules, hardware circuits, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference will now be made in detail to some embodiments of the present disclosure, examples of which are illustrated in the accompanying drawings. To facilitate understanding, embodiments are provided under specific network architecture and new service scenarios, such as 3rd Generation Partnership Project (3GPP) 5G, 3GPP Long Term Evolution (LTE) and so on. Persons skilled in the art know very well that, with the development of network architecture and new service scenarios, the embodiments in the present disclosure are also applicable to similar technical problems; and moreover, the terminologies recited in the present disclosure may change, which should not affect the principle of the present disclosure.

Figure 1:
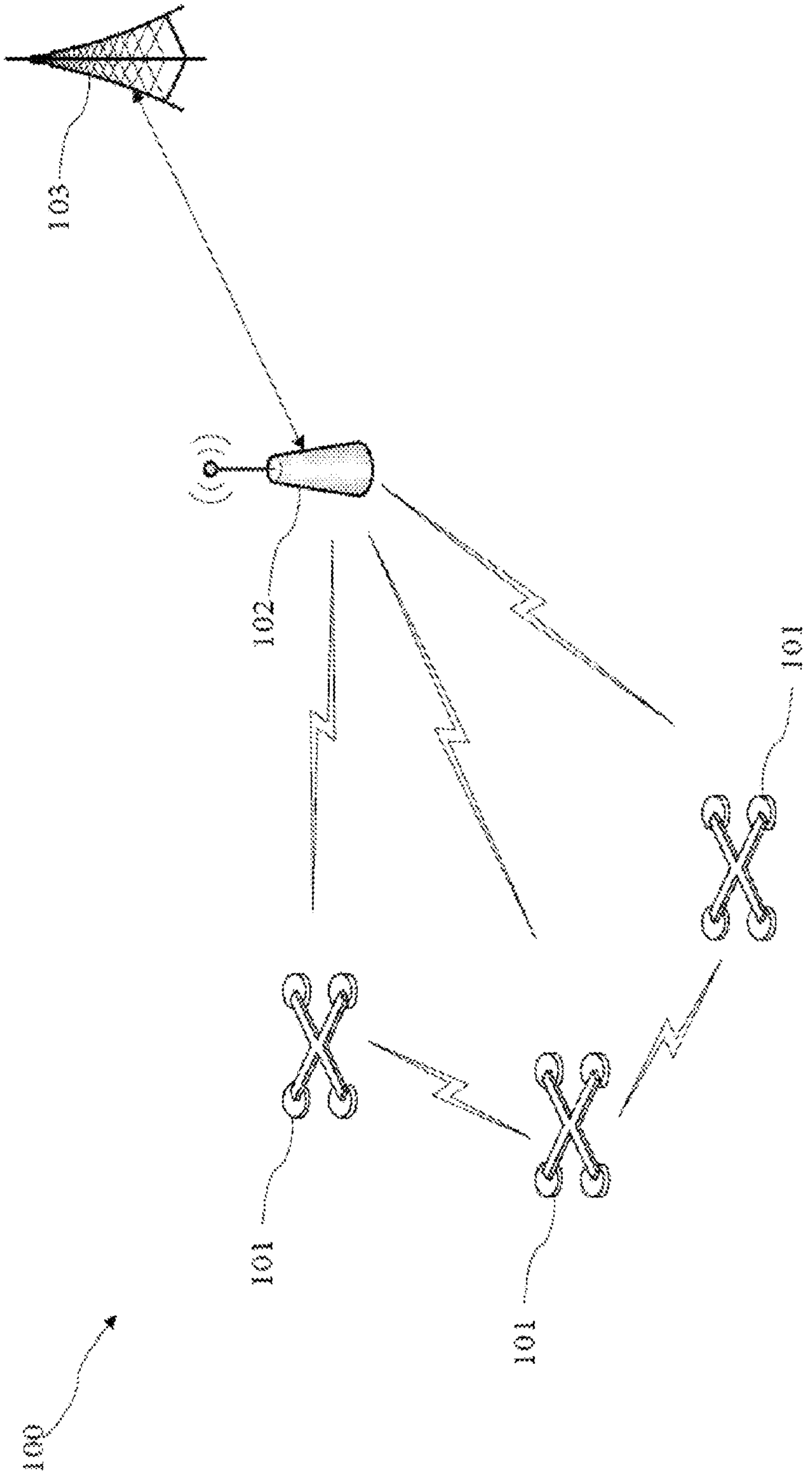
FIG. 1 illustrates an exemplary schematic diagram of a wireless communication system according to some embodiments of the present disclosure.

FIG. 1 illustrates an exemplary schematic diagram of a wireless communication system 100 according to some embodiments of the present disclosure.

As shown in FIG. 1, a wireless communication system 100 may include aerial UEs 101, a BS 102, and a core network (CN) 103. Although a specific number of aerial UEs 101, one BS 102, and one CN 103 are depicted in FIG. 1, it is contemplated that any number of aerial UEs 101, BSs 102, and CNs 103 may be included in the wireless communication system 100.

The CN 103 may include a core Access and Mobility management Function (AMF) entity. The BS 102, which may communicate with the CN 103, may operate or work under the control of the AMF entity. The CN 103 may further include a User Plane Function (UPF) entity, which is communicatively coupled with the AMF entity.

The BS 102 may be distributed over a geographic region. The BS 102 may define one or more cells, and each cell may have a coverage area. In some embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally part of a radio access network that may include one or more controllers communicably coupled to one or more corresponding BS(s).

The aerial UEs 101 may include, for example, but is not limited to, computing devices that are capable of sending and receiving communication signals on a wireless network. Further, the computing devices are capable of flying or are disposed on a flying machine. The aerial UEs 101 may include, for example, but is not limited to, UAVs. The aerial UEs 101 may communicate directly with the BS 102 via Uu links. The aerial UEs 101 may communicate with each other via sidelink.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol or the 5G Reduced capability NR of the 3GPP protocol, wherein the BSs 102 transmit data using an orthogonal frequency division multiplexing (OFDM) modulation scheme on the downlink (DL) and the aerial UEs 101 transmit data on the uplink (UL) using a single-carrier frequency division multiple access (SC-FDMA) or OFDM scheme. More generally, however, the wireless communication system 100 may implement some other open or proprietary communication protocols, for example, WiMAX, among other protocols.

In some embodiments of the present disclosure, the BS 102 may communicate using other communication protocols, such as the IEEE 802.11 family of wireless communication protocols. Further, in some embodiments of the present disclosure, the BS 102 may communicate over licensed spectrums, whereas in other embodiments the BS 102 may communicate over unlicensed spectrums. The present disclosure is not intended to be limited to the implementation of any particular wireless communication system architecture or protocol. In yet some embodiments of the present disclosure, the BS 102 may communicate with the aerial UEs 101 using the 3GPP 5G protocols.

According to some existing agreements, techniques of measurement report may be introduced in the wireless communication system 100. For example, an aerial UE 101 may trigger and transmit a height-based measurement report when the altitude or height of the aerial UE 101 is above or below a configured threshold. The height-based measurement report may include the altitude and location of the aerial UE 101. As another example, an aerial UE 101 may trigger and transmit a measurement report when reference signal receiving power (RSRP) values for a configured number of neighbor cells fulfill a configured event. The configured event may include a radio resource management (RRM) event A3, A4, or A5. According to 3GPP specifications, A3 is an event of "neighbour becomes offset better than serving," A4 is an event of "neighbour becomes better than threshold," and A5 is an event of "serving becomes worse than threshold1 and neighbour becomes better than threshold2." The measurement report may include RRM results, e.g., RSRP value(s) of neighbor cell(s), and a location of the aerial UE 101.

In some embodiments, when all aerial UEs 101 perform transmission of measurement report to the BS 102 via Uu links directly, it may result in significant signaling overhead on Uu links, especially during the phases of taking off and landing on. Therefore, some aerial UEs 101 may perform transmission of measurement report to a specific aerial UE 101 via sidelink. The specific aerial UE 101 can be a master aerial UE in an aerial UE swarm.

Figure 2:
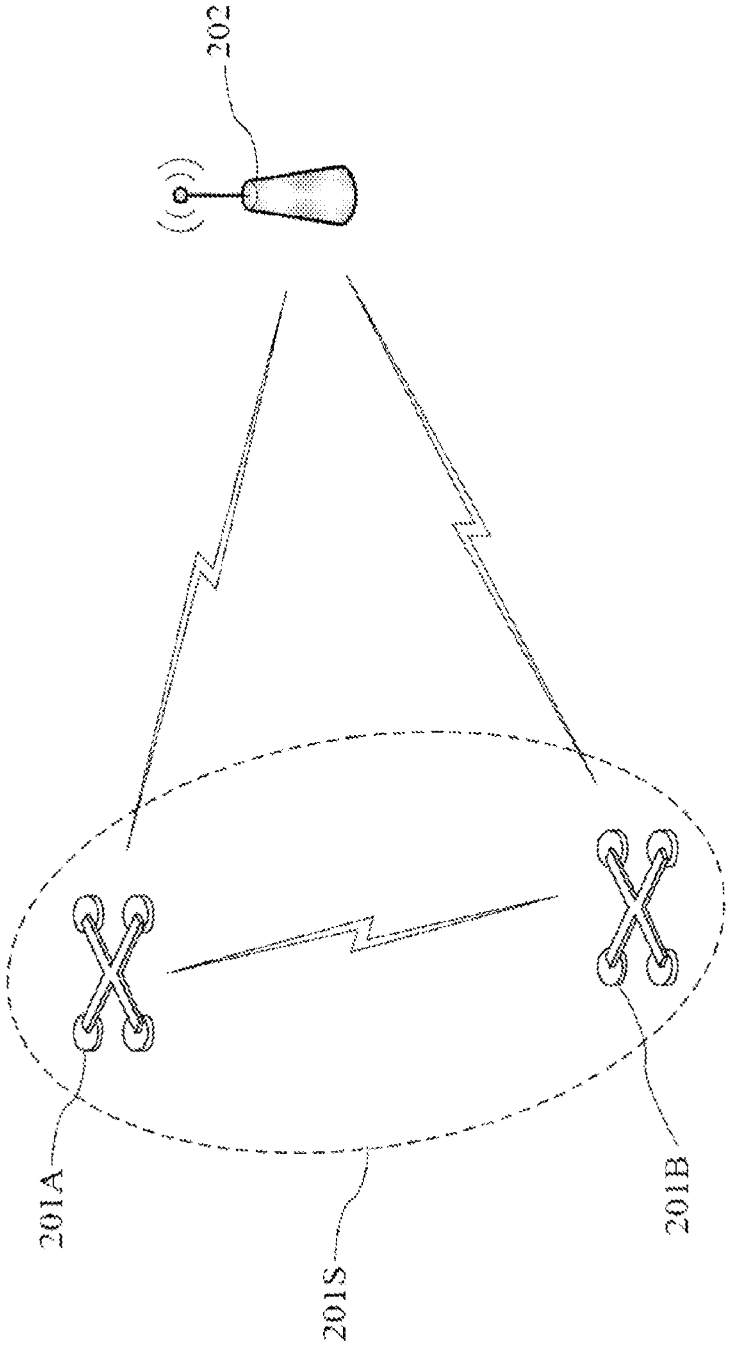
FIG. 2 illustrates an exemplary aerial UE swarm scenario according to some embodiments of the present disclosure.

FIG. 2 illustrates an exemplary aerial UE swarm scenario according to some embodiments of the present disclosure.

As shown in FIG. 2, an aerial UE swarm 201S may include an aerial UE 201A and an aerial UE 201B. In the aerial UE swarm 201S, the aerial UE 201A may be a master aerial UE and the aerial UE 201B may be a member aerial UE. It should be noted that the master aerial UE and the member aerial UE may have the same abilities, and the master aerial UE may be selected (e.g., by a BS 202 or by the aerial UEs of the aerial UE swarm 201S) from the aerial UE swarm 201S for handling the transmissions of measurement reports in the aerial UE swarm 201S. Although one member aerial UE 201B is depicted in FIG. 2, it is contemplated that more member aerial UEs 201B may be included in the aerial UE swarm 201S.

The aerial UE (e.g., the aerial UE 201A or 201B) in the aerial UE swarm 201S may receive a configuration of measurement report from the BS 202, e.g., via Radio Resource Control (RRC) signaling. The configuration of measurement report may configure the aerial UE with a report type.

In some implementations, the report type may be periodical, and the configuration of measurement report may indicate a time period. The aerial UE configured with a periodical report type may periodically trigger and transmit the measurement report.

In some implementations, the report type may be event-triggered, and the configuration of measurement report may indicate at least one event that triggers a measurement report. The at least one event may include but is not limited to event A3, A4, A5, H1, or H2. According to 3GPP specifications, A3 is an event of "neighbour becomes offset better than serving," A4 is an event of "neighbour becomes better than threshold," A5 is an event of "serving becomes worse than threshold1 and neighbour becomes better than threshold2," H1 is an event of "the aerial UE height is above a threshold," and H2 is an event of "the aerial UE height is below a threshold." The aerial UE configured with an event-triggered report type may trigger and transmit the measurement report when the event indicated by the configuration of measurement report is fulfilled. In some embodiments of the present disclosure, for an aerial UE configured with an event A3, A4, or A5, it may trigger and transmit a measurement report when RSRP values for a configured number of neighbor cells fulfill the configured event.

To reduce the signaling overhead on Uu links between the member aerial UEs (e.g., the aerial UE 201B) and the BS 202, the member aerial UEs may transmit their measurement reports to the master aerial UE (e.g., the aerial UE 201A) via sidelink. The master aerial UE 201A may aggregate the measurement reports from the member aerial UEs, and transmit an aggregate measurement report to the BS 202. The measurement results from the member aerial UEs may be reflected in the aggregate measurement report. In some embodiments of the present disclosure, the master aerial UE 201A may not transmit the aggregate measurement report to the BS 202 immediately after receiving a measurement report from a member aerial UE, but only transmit the aggregate measurement report when a certain condition is fulfilled.

Figure 3:
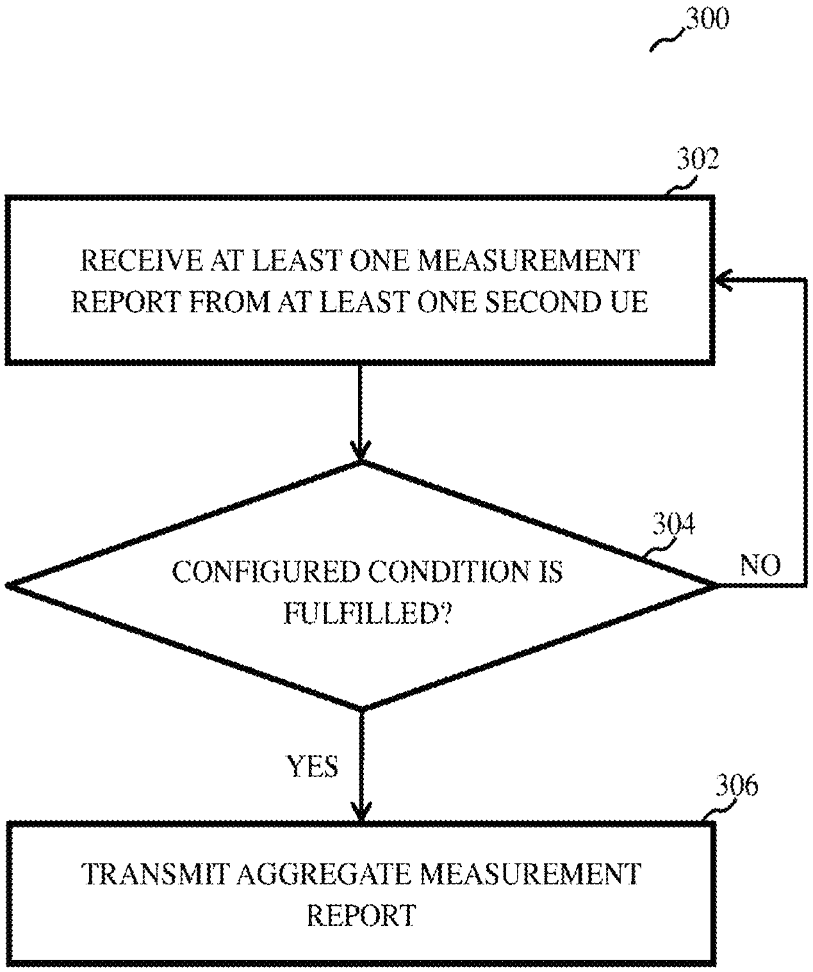
FIG. 3 illustrates a flow chart of an exemplary method for aggregate measurement report according to some embodiments of the present disclosure.

FIG. 3 illustrates a flow chart of an exemplary method 300 for aggregate measurement report according to some embodiments of the present disclosure. The method 300 can be performed by a first UE. In some embodiments, the first UE can be a master aerial UE (e.g., the aerial UE 201A) in an aerial UE swarm.

At step 302, the first UE may receive at least one measurement report from at least one second UE. In some embodiments, the at least one second UE can be at least one member aerial UE (e.g., the aerial UE 201B) in the aerial UE swarm. The at least one measurement report may be periodically transmitted by the at least one second UE. Additionally or alternatively, the at least one measurement report may be event-triggered. Each measurement report may correspond to a report type (e.g., periodical or event-triggered). Each event-triggered measurement report may correspond to an event type (e.g., A3, A4, A5, H1, or H2) that triggers the measurement report. The measurement report(s) or measurement result(s) from the second UE(s) may be stored on the first UE.

At step 304, the first UE may determine, based on a configured condition, whether to transmit an aggregate measurement report which is based on the at least one measurement report. That is, the first UE may determine whether the configured condition that triggers the aggregate measurement report is fulfilled. The first UE may be configured with the condition by a BS (e.g., the BS 202).

When the configured condition is fulfilled (branch "YES"), the first UE may determine to transmit the aggregate measurement report, and then transmit the aggregate measurement report in response to the determination, at step 306.

When the configured condition is not fulfilled (branch "NO"), the first UE may not transmit the aggregate measurement report. The method may return to step 302. The first UE may continue to receive measurement report(s) from the second UE(s) until the configured condition is fulfilled.

According to some embodiments of the present disclosure, the first UE may determine to transmit the aggregate measurement report when a total number of the at least one second UE which triggers the measurement report received by the first UE exceeds a configured threshold.

In an embodiment of the present disclosure, the aggregate measurement report may be based on a report type of the at least one measurement report. For example, all the periodical measurement reports received by the first UE may be aggregated in a first aggregate measurement report, and all the event-triggered measurement reports received by the first UE may be aggregated in a second aggregate measurement report.

In another embodiment of the present disclosure, the aggregate measurement report may be based on an event type of the at least one measurement report when the at least one measurement report is event triggered. For example, all the measurement reports triggered by the event A3 may be aggregated in a first aggregate measurement report, and all the measurement reports triggered by the event A4 may be aggregated in a second aggregate measurement report.

In yet another embodiment, the configured threshold may be based on a report type of the at least one measurement report. For example, the first UE may be configured with a first threshold for periodical measurement reports, and configured with a second threshold for event-triggered measurement reports. When a total number of second UEs which transmit periodical measurement reports to the first UE exceeds the first threshold, the first UE may determine to transmit the aggregate measurement report which aggregates the received periodical measurement reports. When a total number of second UEs which transmit event-triggered measurement reports to the first UE exceeds the second threshold, the first UE may determine to transmit the aggregate measurement report which aggregates the received event-triggered measurement reports.

In still another embodiment, the configured threshold may be based on an event type of the at least one measurement report when the at least one measurement report is event triggered. For example, the first UE may be configured with a first threshold for measurement reports triggered by the event A3, and configured with a second threshold for measurement reports triggered by the event A4. When a total number of second UEs which transmit measurement reports triggered by the event A3 to the first UE exceeds the first threshold, the first UE may determine to transmit the aggregate measurement report which aggregates the measurement reports triggered by the event A3. When a total number of second UEs which transmit measurement reports triggered by the event A4 to the first UE exceeds the second threshold, the first UE may determine to transmit the aggregate measurement report which aggregates the measurement reports triggered by the event A4.

According to some embodiments of the present disclosure, the first UE may determine to transmit the aggregate measurement report when a total number of cells reported by the at least one measurement report exceeds a configured threshold. Alternatively, the first UE may determine to transmit the aggregate measurement report when a total number of different cells reported by the at least one measurement report exceeds a configured threshold. A cell reported by a measurement report may refer to the cell whose measurement result (e.g., RSRP value) is included in the measurement report.

In an embodiment of the present disclosure, the aggregate measurement report may be based on a report type of the at least one measurement report. For example, all the periodical measurement reports received by the first UE may be aggregated in a first aggregate measurement report, and all the event-triggered measurement reports received by the first UE may be aggregated in a second aggregate measurement report.

In another embodiment of the present disclosure, the aggregate measurement report may be based on an event type of the at least one measurement report when the at least one measurement report is event triggered. For example, all the measurement reports triggered by the event A3 may be aggregated in a first aggregate measurement report, and all the measurement reports triggered by the event A4 may be aggregated in a second aggregate measurement report.

In yet another embodiment, the configured threshold may be based on a report type of the at least one measurement report. For example, the first UE may be configured with a first threshold for periodical measurement reports, and configured with a second threshold for event-triggered measurement reports. When a total number of cells (or different cells) reported by periodical measurement reports received by the first UE exceeds the first threshold, the first UE may determine to transmit the aggregate measurement report which aggregates the received periodical measurement reports. When a total number of cells (or different cells) reported by event-triggered measurement reports received by the first UE exceeds the second threshold, the first UE may determine to transmit the aggregate measurement report which aggregates the received event-triggered measurement reports.

In still another embodiment, the configured threshold may be based on an event type of the at least one measurement report when the at least one measurement report is event triggered. For example, the first UE may be configured with a first threshold for measurement reports triggered by the event A3, and configured with a second threshold for measurement reports triggered by the event A4. When a total number of cells (or different cells) reported by measurement reports triggered by the event A3 exceeds the first threshold, the first UE may determine to transmit the aggregate measurement report which aggregates the measurement reports triggered by the event A3. When a total number of cells (or different cells) reported by measurement reports triggered by the event A4 exceeds the second threshold, the first UE may determine to transmit the aggregate measurement report which aggregates the measurement reports triggered by the event A4.

According to some embodiments of the present disclosure, the first UE may determine to transmit the aggregate measurement report when a report trigger event for the first UE is fulfilled. For example, when the first UE is configured with event trigger of A3, the first UE may transmit its measurement report when the event A3 is fulfilled. At the same time, the first UE may determine to transmit the aggregate measurement report together with its measurement report. Alternatively, the first UE may determine, based on an additional condition, whether to transmit the aggregate measurement report or its measurement report when the report trigger event for the first UE is fulfilled. In an embodiment of the present disclosure, the additional condition may include whether the different cells reported by the aggregate measurement report are more than those reported by the measurement report of the first UE. That is, the first UE may determine to transmit the aggregate measurement report when a total number of different cells reported by the measurement report(s) from the second UE(s) is larger than a total number of different cells reported by the measurement report of the first UE.

In some embodiments of the present disclosure, a timer can be configured to guarantee aggregate measurement results to be reported in time. After an initialization phase or transmission of the latest aggregate measurement report, the first UE may start the timer when receiving the first measurement report from a second UE. When the configured condition for triggering the aggregate measurement report is fulfilled before the timer expires, the first UE may transmit the aggregate measurement report and stop the timer. When the timer expires, the first UE may transmit the aggregate measurement report even if the configured condition is not fulfilled.

According to some embodiments of the present disclosure, the aggregate measurement report transmitted by the first UE to the BS may include a list of measurement results from the measurement report(s) received by the first UE from the second UE(s). The list may additionally include identifier(s) of the second UE(s), report type(s) of the measurement report(s), or event type(s) of the measurement report(s). For example, an entry in the list may include an identifier of a second UE and measurement result(s) received from the second UE.

According to some other embodiments of the present disclosure, the aggregate measurement report transmitted by the first UE to the BS may include a processed measurement result based on the measurement report(s) received by the first UE from the second UE(s). For example, when the measurement reports received from multiple second UEs include heights of the second UEs, the aggregate measurement report may include an average height of the second UEs. As another example, when the measurement reports received from multiple second UEs include RSRP values for multiple cells, the first UE may calculate an average RSRP value for each cell and include the average RSRP value in the aggregate measurement report. The aggregate measurement report may also include identifier(s) of the second UE(s), report type(s) of the measurement report(s), or event type(s) of the measurement report(s).

Figure 4:
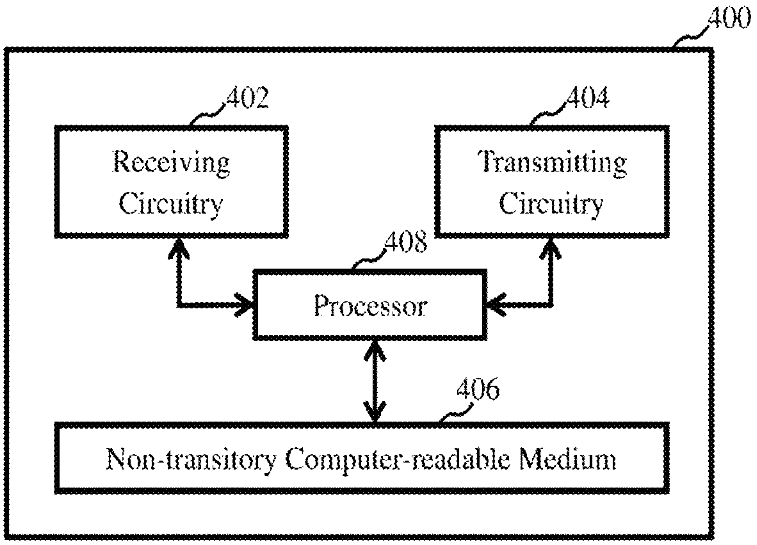
FIG. 4 illustrates an exemplary block diagram of an apparatus according to some embodiments of the present disclosure.

FIG. 4 illustrates an exemplary block diagram of an apparatus 400 according to some embodiments of the present disclosure. In some embodiments of the present disclosure, the apparatus 400 may be or include a UE (e.g., the aerial UE 201A) or other devices having similar functionality. In some embodiments, the apparatus 400 can be configured to perform the method illustrated in FIG. 3.

As shown in FIG. 4, the apparatus 400 may include at least one receiving circuitry 402, at least one transmitting circuitry 404, at least one non-transitory computer-readable medium 406, and at least one processor 408 coupled to the at least one receiving circuitry 402, the at least one transmitting circuitry 404, the at least one non-transitory computer-readable medium 406. While shown to be coupled to each other via the at least one processor 408 in the example of FIG. 4, the at least one receiving circuitry 402, the at least one transmitting circuitry 404, the at least one non-transitory computer-readable medium 406, and the at least one processor 408 may be coupled to one another in various arrangements. For example, the at least one receiving circuitry 402, the at least one transmitting circuitry 404, the at least one non-transitory computer-readable medium 406, and the at least one processor 408 may be coupled to each other via one or more local buses (not shown for simplicity).

Although in FIG. 4, elements such as receiving circuitry 402, transmitting circuitry 404, non-transitory computer-readable medium 406, and processor 408 are described in the singular, the plural is contemplated unless limitation to the singular is explicitly stated. In some embodiments of the present disclosure, the at least one receiving circuitry 402 and the at least one transmitting circuitry 404 may be combined into a single device, such as a transceiver. In certain embodiments of the present disclosure, the apparatus 400 may further include an input device, a memory, and/or other components.

In some embodiments of the present disclosure, the at least one non-transitory computer-readable medium 406 may have stored thereon computer-executable instructions which are programmed to cause the at least one processor 408 to implement the steps of the methods according to embodiments of the present disclosure, for example as described in view of FIG. 3, with the at least one receiving circuitry 402 and the at least one transmitting circuitry 404. For example, when executed, the instructions may cause the at least one processor 408 to receive, with the at least one receiving circuitry 402, at least one measurement report from at least one second UE. The instructions may further cause the at least one processor 408 to determining, based on a configured condition, whether to transmit an aggregate measurement report which is based on the at least one measurement report. The instructions may further cause the at least one processor 408 to transmit, with the at least one transmitting circuitry 404, the aggregate measurement report in response to determining to transmit the aggregate measurement report.

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration (VLSI) circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, or program code. The storage devices may be tangible, non-transitory, or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Furthermore, the described features, structures, or characteristics of the embodiments may be combined in any suitable manner. While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed is:

1. A method performed by a first user equipment (UE), comprising:

receiving a plurality of measurement reports from one or more second UEs;

determining that a total number of different cells reported by the plurality of measurement reports exceeds a configured threshold, wherein a cell reported by a measurement report comprises a cell whose measurement result is included in the measurement report; and transmitting, in response to determining that the total number of different cells reported by the plurality of measurement reports exceeds the configured threshold, an aggregate measurement report which is based on the plurality of measurement reports.

2. The method of claim 1, further comprising:

transmitting the aggregate measurement report in response to a total number of the one or more second UEs exceeding a second configured threshold.

3. The method of claim 1, wherein the configured threshold is based on a report type of the plurality of measurement reports.

4. The method of claim 1, wherein the configured threshold is based on an event type of the plurality of measurement reports when the plurality of measurement reports are event triggered.

5. The method of claim 1, further comprising:

transmitting both the aggregate measurement report and a measurement report of the first UE when a report trigger event for the first UE is fulfilled.

6. The method of claim 1, further comprising:

transmitting, based on an additional condition, the aggregate measurement report or a measurement report of the first UE when a report trigger event for the first UE is fulfilled.

7. The method of claim 6, further comprising:

transmitting the aggregate measurement report when the total number of different cells reported by the plurality of measurement reports is larger than the total number of different cells reported by the plurality of measurement reports of the first UE.

8. The method of claim 1, further comprising:

starting a timer if a first one of the plurality of measurement reports is received; and transmitting the aggregate measurement report if the timer expires.

9. The method of claim 1, wherein the aggregate measurement report comprises at least one of a list of measurement results from the plurality of measurement reports, or a processed measurement result based on the plurality of measurement reports.

10. A first user equipment (UE) for wireless communication, comprising:

at least one memory; and at least one processor coupled with the at least one memory and configured to cause the first UE to:

receive a plurality of measurement reports from one or more second UEs;

determine that a total number of different cells reported by the plurality of measurement reports exceeds a configured threshold, wherein a cell reported by a measurement report comprises a cell whose measurement result is included in the measurement report; and transmit, in response to determining that the total number of different cells reported by the plurality of measurement reports exceeds the configured threshold, an aggregate measurement report which is based on the plurality of measurement reports.

11. The first UE of claim 10, the at least one processor is further configured to cause the first UE to:

transmit the aggregate measurement report based on a total number of the one or more second UEs exceeding a second configured threshold.

12. The first UE of claim 10, wherein the configured threshold is based on a report type of the plurality of measurement reports.

13. The first UE of claim 10, wherein the configured threshold is based on an event type of the plurality of measurement reports if the plurality of measurement reports are event triggered.

14. The first UE of claim 10, wherein the at least one processor is further configured to cause the first UE to:

transmit both the aggregate measurement report and a measurement report of the first UE based on a report trigger event for the first UE is fulfilled.

15. The first UE of claim 10, the at least one processor is further configured to cause the first UE to:

transmit, based on an additional condition, the aggregate measurement report or a measurement report of the first UE based on a report trigger event for the first UE is fulfilled.

16. The first UE of claim 15, wherein the at least one processor is further configured to cause the first UE to:

transmit the aggregate measurement report based on the total number of different cells reported by the plurality of measurement reports is larger than the total number of different cells reported by the plurality of measurement reports of the first UE.

17. The first UE of claim 10, wherein the aggregate measurement report is based on a report type of the plurality of measurement reports.

18. The first UE of claim 10, wherein the aggregate measurement report is based on an event type of the plurality of measurement reports if the plurality of measurement reports are event triggered.

19. The first UE of claim 10, wherein the at least one processor is further configured to cause the first UE to:

start a timer based on receiving a first one of the plurality of measurement reports; and transmit the aggregate measurement report if the timer expires.

20. A processor for wireless communication, comprising: at least one controller coupled with at least one memory and configured to cause the processor to:

receive a plurality of measurement reports from one or more user equipment (UEs);

determine that a total number of different cells reported by the plurality of measurement reports exceeds a configured threshold, wherein a cell reported by a measurement report comprises a cell whose measurement result is included in the measurement report; and transmit, in response to determining that the total number of different cells reported by the plurality of measurement reports exceeds the configured threshold, an aggregate measurement report which is based on the plurality of measurement reports.

* * * * *